(12) United States Patent
Xu et al.

(10) Patent No.: US 6,276,842 B1
(45) Date of Patent: Aug. 21, 2001

(54) OPTICAL COMPONENT, METHOD FOR POLISHING THE END FACES OF OPTICAL COMPONENT, AND APPARATUS FOR POLISHING THE SAME

(75) Inventors: Jie Xu; Kenji Suzuki, both of Tokyo (JP)

(73) Assignee: The Furukawa Electric Co. Ltd., Tokyo (JP)

( * ) Notice: Subject to any disclaimer, the term of this patent is extended or adjusted under 35 U.S.C. 154(b) by 0 days.

(21) Appl. No.: 09/374,120

(22) Filed: Aug. 16, 1999

Related U.S. Application Data

(63) Continuation of application No. PCT/JP98/05650, filed on Dec. 15, 1998.

(30) Foreign Application Priority Data

Dec. 16, 1997 (JP) .................................................. 9-363427

(51) Int. Cl.[7] ................................ G02B 6/36; B24B 1/00
(52) U.S. Cl. ................................ 385/85; 385/78; 451/41; 451/51; 451/66
(58) Field of Search .................................. 451/41, 51, 55, 451/53, 56, 65, 66, 278; 385/85, 76, 60, 78

(56) References Cited

U.S. PATENT DOCUMENTS 5,245,790 * 9/1993 Jerbic ..................................... 51/121
6,110,013 * 8/2000 Minami et al. ........................ 451/41
6,113,469 * 9/2000 Yoshikawa et al. ................... 451/41

FOREIGN PATENT DOCUMENTS 2-109667  4/1990 (JP) .
8-126951  5/1996 (JP) .
9-248750  9/1997 (JP) .

\* cited by examiner

Primary Examiner—Hemang Sanghavi
(74) Attorney, Agent, or Firm—Lacasse & Associates

(57) ABSTRACT

The invention relates to a method and apparatus for polishing the end faces of optical components so that the end faces of an optical wave guide protrude a desired amount of protrusion from the connection end faces (of the ferrule) of the optical component. The polishing apparatus is composed of a connector holding section (16), a ferrule disposing section (15), and an ultrasonic wave generator (14). With an optical connector (1) held at the connector holding section (16), the end faces (6) are opposed to the connection end faces (of the ferrule) (5) side via a polishing member (20) and a ferrule (3) is disposed on the ferrule disposing section (15). A stepped guide pin (11) is inserted into the respective pin fitting holes (9) and (10) of the optical connector (1) and the ferrule (3), thereby correctly positioning the optical connector (1) and ferrule (3), wherein the ultrasonic wave generator (14) is driven in a state where the ferrule (3) is pressed to the optical connector (1) side. By vibrating the ferrule (3) in the optical axis direction of the optical fibers (4), the connection end faces (of the ferrule) of the optical fibers (4) are polished so that the connection end faces (of the ferrule) thereof protrude from the connection end faces (of the ferrule) (5) of the ferrule (2).

14 Claims, 12 Drawing Sheets

(a)

(b)

OPTICAL COMPONENT, METHOD FOR POLISHING THE END FACES OF OPTICAL COMPONENT, AND APPARATUS FOR POLISHING THE SAME

This application is a continuation of PCT International Application No. PCT/JP98/05650 filed Dec. 15, 1998 entitled Optical Part and Method and Device for Polishing End Face of same.

FIELD OF THE INVENTION

The present invention relates to an optical component used in, for example, optical transmission; a method for polishing the end faces of the optical component, by which an optical wave guide such as an optical fiber is caused to protrude and is finished by polishing the connection end faces (of the ferrule) thereof, and an apparatus for polishing the same.

BACKGROUND ART

FIG. 16 shows one example of a multiple-fiber optical connector which is representative of an optical component. As shown in the same drawing, the optical connector 1 has a ferrule 2 which acts as a housing. An optical fiber 4 whose coating is removed at its tip end of an optical fiber ribbon 12 is inserted into an optical fiber insertion hole 7 formed inside the ferrule 2 so that the end faces side thereof are exposed to the connection end faces 5 of the ferrule 2. The connection end side of the optical fiber 4 is fixed at the ferrule 2 with an adhesive agent or the like in a state where the connection end thereof protrudes, for example, 1 μm from the connection end faces 5 of the ferrule 2. A pin fitting hole 9 is formed at both sides of the fixing area of the optical fiber 4, thereby assembling the optical connector 1. Furthermore, the above-mentioned optical fiber 4 acts as an optical wave guide.

FIG. 17 shows one example of a connected structure of such a multiple-fiber optical connector 1. The optical connector 1 illustrated in the same drawing is formed so that the connection end faces 5 (of the ferrule) thereof are formed to be a plane inclined 8 degrees with respect to the plane orthogonal to the optical axis of the optical fiber 4 and a plane orthogonal to the optical axis. Furthermore, in the same drawing, the optical connector 1a is illustrated by a side elevational view and the optical connector 1b is illustrated by a sectional view. As shown in the same drawing, the optical connector 1a and optical connector 1b are disposed so that their connection end faces 5 (of the ferrule) thereof are opposite to each other, and the optical connector 1a and optical connector 1b are positioned with respect to each other by fitting a common connection pin 36 into a pin fitting hole 9 of the optical connector 1a and a pin fitting hole 9 of the optical connector 1b.

And, by this positioning, the optical fibers 4 of the optical connectors 1a and 1b are positioned, wherein the connection end faces (of the ferrule) of the optical fibers 4 are directly and physically connected to each other without any connection assisting agent or the like. Furthermore, such a directly physical connection of optical fibers 4 is called a PC contact (physical contact) of optical fibers 4.

As described above, in order to enable the PC contact of optical fibers 4 at the optical connector 1, conventionally, for example, as shown in FIG. 18, a slurry-like lapping liquid containing alumina is placed on a polishing base 33, and the connection end faces 5 (of the ferrule) of the optical connector 1 are pressed to the lapping liquid 40 to polish the connection end faces (of the ferrule) thereof. In this polishing, utilizing the difference in materials between the ferrule 2 of the optical connector 1 and the optical fibers 4, the ferrule 2 which is softer than the optical fibers 4 is more polished by the lapping liquid 40, wherein the connection end faces (of the ferrule) of the optical fibers 4 are to caused to protrude 1 μm or so from the connection end faces 5 of the ferrule 2 as described above.

However, the material of the ferrule 2 of the optical connector 1 is composed of a mixed material consisting of glass at a ratio of, for example, 80 percent, and resin at a ratio of 20 percent. Since the difference in hardness between the optical fibers 4 formed of quartz glass or the like and the ferrule 2 is not so great, there was such a problem, by which a remarkably long time was required to cause the connection end faces (of the ferrule) of the optical fibers 4 to protrude slightly 1 μm from the connection end faces 5 of the ferrule 2 as described above, and a longer period of time was required to polish the optical connector 1.

Furthermore, since the connection end faces (of the ferrule) of the optical fibers 4 are permitted to protrude a slightly short length of only 1 μm from the connection end faces 5 of the ferrule 2 even though a greater amount of time is taken, it was difficult to guarantee a good quality PC contact without fail, by protrusion of the optical fibers. Moreover, there is another problem, wherein if the amount of protrusion of optical fibers 4 is slight, a clearance is produced between the connection end faces (of the ferrule) of optical fibers 4 of optical connectors 1a and 1b even though the optical connectors 1a and 1b make only a slight positional slip, and the optical connection loss of the optical fibers 4 is increased.

The present invention was developed in order to solve the abovementioned conventional shortcomings and problems, and it is therefore an object of the invention to provide an optical component, a method for polishing the end faces of optical components, and an apparatus for polishing the same, by which it is possible to polish an optical wave guide such as optical fibers with the optical wave guide protruded a desired length from the connection end faces (of the ferrule) of an optical component such as an optical connector, and a good quality PC contact is enabled between optical components.

DISCLOSURE OF INVENTION

In order to solve the abovementioned object, the present invention employs the following means. That is, the first aspect of a method for polishing the connection end faces (of the ferrule) of an optical component according to the invention comprises the steps of: disposing a polish-assisting member having a recess formed at the position corresponding to an area including optical wave guide end faces exposed to the connection end faces (of the ferrule) of an optical component opposite to the connection end faces (of the ferrule) of the abovementioned optical component via polishing media between the position and the connection end face of the abovementioned optical component; polishing the connection end faces (of the ferrule) of the optical component by relatively moving at least one of either the abovementioned polish-assisting members or the abovementioned optical component in a direction of narrowing and widening the interval between the connection end faces (of the ferrule) opposite to each other; and causing the area including the connection end faces (of the ferrule) of the abovementioned optical wave guide to protrude from the connection end faces (of the ferrule) of the optical component at the surrounding thereof.

The second aspect of a method for polishing the connection end faces (of the ferrule) of an optical component according to the invention comprises the steps of: disposing a polish-assisting member, in which a softer member than the surrounding is secured, at the position corresponding to the area including the connection end faces (of the ferrule) of an optical wave guide exposed to the connection end faces (of the ferrule) of an optical component via polishing media between the position and the connection end faces (of the ferrule) of the abovementioned optical component; polishing the connection end faces (of the ferrule) of the optical component by relatively moving at least one of either the abovementioned polish-assisting members or the abovementioned optical component in a direction of narrowing and widening the interval between the connection end faces (of the ferrule) opposite to each other; and causing the area including the connection end faces (of the ferrule) of the abovementioned optical wave guide to protrude from the connection end faces (of the ferrule) of the optical component at the surrounding thereof.

Furthermore, the third aspect of a method for polishing the connection end faces (of the ferrule) of an optical component according to the invention comprises the step of providing a softer member than a material forming a polish-assisting member, in the surrounding of the recess in the abovementioned recess of the polish-assisting member in addition to the construction as set forth in the first aspect of the invention.

Furthermore, the fourth aspect of a method for polishing the connection end faces (of the ferrule) of an optical component according to the invention is featured in that the polish-assisting member is a ferrule in which optical fiber insertion holes are formed, and the abovementioned optical fiber insertion holes are recesses, in addition to the abovementioned first or third construction.

Furthermore, the fifth aspect of a method for polishing the connection end faces (of the ferrule) of an optical component according to the invention is featured in that, in addition to the abovementioned fourth construction, the abovementioned optical component is an optical connector having optical fibers inserted into and fixed at the ferrule and having pin fitting holes formed at both sides of the corresponding optical fiber fixing area, wherein a pin fitting hole is provided at positions corresponding to the pin fitting holes of the abovementioned optical connector are formed at both sides of the recesses of the polish-assisting member, and the connection end faces (of the ferrule) of an optical component are polished in a state where a fitting pin is fitted into the pin fitting hole of the corresponding polish-assisting member and pin fitting hole of the abovementioned optical connector.

Furthermore, the sixth aspect of a method for polishing the connection end faces (of the ferrule) of an optical component according to the invention is featured in that, in addition to the abovementioned first construction, the recess of the polish-assisting member is positioned with respect to the area including the connection end faces (of the ferrule) of an optical wave guide exposed to the connection end faces (of the ferrule) of an optical component with reference to the outside appearance of the abovementioned optical component and the outside appearance of the polish-assisting member, wherein the connection end faces (of the ferrule) of the optical component are polished.

Furthermore, the seventh aspect of a method for polishing the connection end faces (of the ferrule) of an optical component according to the invention is featured in that, in addition to the abovementioned first, second, third, fifth or sixth construction, at least one of either the polish-assisting members or the optical components are relatively moved in a direction of narrowing and widening the interval between the mutually opposed faces by giving ultrasonic vibrations or vibrations by a vibrator to at least one of either the abovementioned polish-assisting members or optical components.

Furthermore, the eighth aspect of a method for polishing the connection end faces (of the ferrule) of an optical component according to the invention is featured in that, in addition to the abovementioned fourth construction, at least one of either the polish-assisting members or optical components is relatively moved in a direction of narrowing and widening the interval between the mutually opposed end faces by giving ultrasonic vibrations or vibrations by a vibrator to at least one of either the abovementioned polish-assisting members or optical components.

Furthermore, the first aspect of an apparatus for polishing the connection end faces (of the ferrule) of an optical component according to the invention comprises: a holding section of an optical component; a section for disposing the polish-assisting member, which disposes a polish-assisting member having a recess formed at the position corresponding to an area including an optical wave guide end faces exposed to the connection end faces (of the ferrule) of an optical component held at the holding section of the abovementioned optical component via polishing media between the position and the connection end faces (of the ferrule) of the abovementioned optical component; and a polishing and moving mechanism which polishes the area including the connection end faces (of the ferrule) of the abovementioned optical wave guide by relatively moving at least one of either the corresponding polish-assisting members or the optical components in a direction of narrowing and widening the interval between mutually opposed end faces thereof so that the abovementioned area protrudes from the connection end faces (of the ferrule) at the surrounding thereof.

Furthermore, the second aspect of an apparatus for polishing the connection end faces (of the ferrule) of an optical component according to the invention is featured in that, in addition to the first construction, the abovementioned holding section holds a plurality of optical components, and the abovementioned polishing and moving mechanism relatively moves at least one of either the abovementioned polish-assisting members or a group of optical components in a direction of vibrating and changing the interval between mutually opposed end faces in a state where polishing media intervene between the connection end faces (of the ferrule) of the abovementioned group of the optical components held at the abovementioned holding sections of optical components and the polish-assisting members, wherein the area including the connection end faces (of the ferrule) of the optical wave guide of the group of optical components is polished so that the area protrudes from the connection end faces (of the ferrule) of the optical components at the surrounding thereof.

Furthermore, the third aspect of an apparatus for polishing the connection end faces (of the ferrule) of an optical component according to the invention is featured in that, in addition to the abovementioned first or second construction, the abovementioned polishing and moving mechanism is an ultrasonic wave vibration device or a vibration generating device using a vibrator.

Furthermore, the first aspect of an optical component according to the invention is an optical component having a plurality of optical wave guide connection end faces exposed to the connection end faces (of the ferrule) of the optical component, wherein an area including the optical wave guide connection end faces exposed to the connection end faces (of the ferrule) of the optical component is polished by any one of the polishing methods described above, the area including the optical wave guide connection end faces is caused to protrude from the connection end faces (of the ferrule) at the surrounding thereof, and the length unevenness of protrusion among the end faces of the optical wave guide (or optical fibers) is established to be a little less than 0.5 $\mu$m.

The second aspect of an optical component according to the invention is an optical component having a plurality of optical wave guide connection end faces exposed to the connection end faces (of the ferrule) of the optical component, wherein an area including the optical wave guide connection end faces exposed to the connection end faces (of the ferrule) of the optical component is polished by any one of the polishing methods described above, the area including the optical wave guide connection end faces is caused to protrude from the connection end faces (of the ferrule) at the surrounding thereof, and the amount of protrusion of connection end faces including the optical wave guide from the end face of the ferrule is established to be 5 $\mu$m or less.

According to the method and apparatus for polishing the end faces of optical components of the invention, a polish-assisting member having a recess formed at the position corresponding to an area including an optical wave guide end faces exposed to the connection end faces (of the ferrule) of an optical component is disposed opposite to the connection end faces (of the ferrule) of the optical component via polishing media between the position and the connection end faces (of the ferrule) of the optical component, and the connection end faces (of the ferrule) of the optical component are polished by relatively moving at least one of either the polish-assisting member or the optical component in a direction of narrowing and widening the interval between the mutually opposed end faces, wherein by the abovementioned relative movement, only the area other than the recess-formed section of the abovementioned polish-assisting member, that is, the area other than the area including the optical wave guide end faces of the optical component is polished, and the area including the connection end faces (of the ferrule) of the optical component is not polished or is scarcely polished. Therefore, it is possible to easily and accurately cause the area including the connection end faces (of the ferrule) of the optical wave guide of an optical component to protrude from the connection end faces (of the ferrule) of the optical component at the surrounding thereof in a very short time.

Therefore, according to the invention, by adequately setting the polishing conditions such as a polishing time, etc., it is possible to set the area including optical wave guide end faces such as optical fibers to an appointed amount of protrusion ranging, for example, from roughly 1 to 5 $\mu$m. Therefore, for example, in an optical connector provided with optical fibers, it is possible to securely obtain a good quality PC contact of optical fibers by connecting the optical connectors by causing the connection end faces (of the ferrule) of the optical fibers to protrude from the ferrule at the surrounding of the optical fibers.

Furthermore, according to the method for polishing optical component end faces of the invention, in which a softer material than the material to form a polish-assisting member at the surrounding of a recess is provided at the abovementioned recess (recess formed position) of the abovementioned polish-assisting member or a softer material than the surrounding of the area including optical wave guide end faces exposed to the connection end faces (of the ferrule) of an optical component is provided at the position corresponding to the abovementioned area, and since it is possible to further reduce polishing energy given to the optical wave guide end faces of the optical component or the area including the corresponding optical wave guide end faces than polishing energy given to the connection end faces (of the ferrule) of the optical component at the surrounding thereof due to a difference in the resiliency Young's modulus between the soft material and the material to form the polish-assisting member at the surrounding thereof, effects which are similar to the abovementioned effects can be obtained.

Furthermore, according to the method for polishing end faces of an optical component in which the abovementioned polish-assisting member is determined to be a ferrule in which optical fiber insertion holes are formed and the optical fiber insertion holes are determined to be recesses, it is possible to easily and accurately carry out polishing of the connection end faces (of the ferrule) of optical connectors, in which optical fibers are inserted into and fixed in the optical fiber insertion holes of the connector side ferrule, by using the abovementioned polish-assisting member as well.

Furthermore, according to the method for polishing end faces of an optical component of the invention, the optical component is an optical connector constructed so that optical fibers are inserted into and fixed in a ferrule and pin fitting holes for connection are formed at both sides of the corresponding optical fiber fixing area, pin fitting holes are formed at the position corresponding to the pin fitting holes of the abovementioned optical connector at both sides of the optical fiber insertion holes of the polish-assisting member, and fitting pins are inserted into the pin fitting holes of the corresponding polish-assisting member and the pin fitting holes of the abovementioned optical connector, whereby the connection end faces (of the ferrule) of the optical component are polished. In this case, since it is possible to very easily and accurately position the optical connector with the polish-assisting member by inserting the abovementioned insertion pins, the area including the optical fiber end faces is very easily and accurately caused to protrude an appointed amount from the connection end faces of the ferrule in a very short time.

Furthermore, according to the invention, the recesses of the polish-assisting members are positioned with respect to the optical wave guide end faces exposed to the connection end faces (of the ferrule) of an optical component with reference to the outside appearance of the optical component and that of the polish-assisting member, and polishing of the connection end faces (of the ferrule) of the optical component is carried out, since it is possible to easily and accurately position the optical component to the polish-assisting member as in the case of the invention in which positioning of the optical component to the polish-assisting member is performed by inserting the abovementioned fitting pins, wherein polishing of such optical component end faces as described can be very easily and accurately carried out.

Furthermore, according to the method for polishing the connection end faces (of the ferrule) of an optical component of the invention in which at least one of either the polish-assisting member or the optical component is relatively moved in a direction of narrowing and widening the interval between the mutual end faces by giving ultrasonic vibrations or vibrations made by a vibrator to at least one of either the polish-assisting members or the optical component, at least one of either the polish-assisting members and the optical components are easily controlled for movements thereof by the ultrasonic vibrations, wherein such polishing of the end faces of an optical component as described above can be easily and accurately carried out. Furthermore, it is further advantageous in view of the easily variable adjustment of the vibration energy produced by ultrasonic waves and a vibrator.

Furthermore, according to the apparatus for polishing the end faces of an optical component of the invention, the optical component holding section is constructed so that a plurality of optical components can be held, and the polishing and moving mechanism is constructed so that the area including the connection end faces (of the ferrule) of an optical wave guide of a group of optical components is polished so as to protrude from the connection end faces (of the ferrule) of the abovementioned holding section at the surrounding thereof by relatively moving at least one of either the corresponding polish-assisting members and the abovementioned optical components in a direction of narrowing and widening the interval between the mutual end faces in a state where polishing media intervene between the connection end faces (of the ferrule) of the group of optical components held by the abovementioned holding section of optical components and the abovementioned polish-assisting members. Therefore, since it is possible to collectively polish the end faces of a group of optical components, the apparatus is formed of excellent construction so as to more efficiently polish the end faces of optical components as described above.

Furthermore, according to the apparatus for polishing the end faces of optical components in which the abovementioned polishing and moving mechanism is an ultrasonic vibration generator or a vibration generating device consisting of a vibrator, ultrasonic vibration is generated by ultrasonic waves or a vibration generating device consisting of a vibrator and causes at least one of either the abovementioned polish-assisting members or optical components in a direction of narrowing and widening the interval therebetween, wherein the apparatus is formed to be an excellent apparatus constructed so that polishing of such optical components can be very easily and accurately carried out.

Furthermore, in the specification, the wording "an area including optical wave guide end faces" is used as a concept including both a case meaning an area of only the optical wave guide end faces (the area collaborative with the optical wave guide end faces) and a case meaning an area including optical wave guide end faces expanded to the outside of the corresponding optical wave guide end faces (an area greater than the corresponding optical wave guide end faces, surrounding the optical wave guide end faces).

BEST MODE FOR CARRYING OUT THE INVENTION

Figure 1:
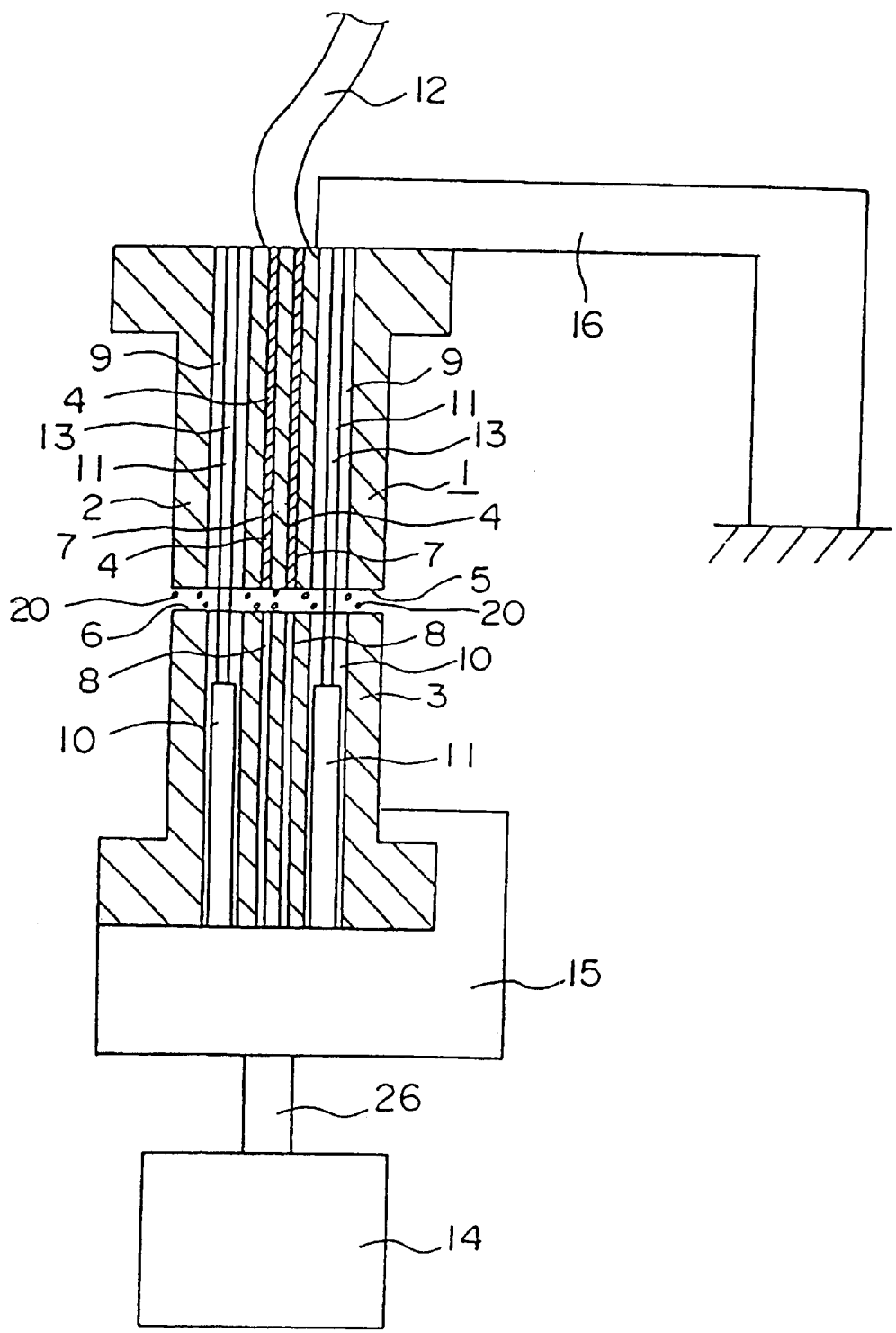
FIG. 1 is a front elevational view of major pats showing one preferred embodiment of an apparatus for polishing the end faces of optical components according to the invention.
Figure 2:
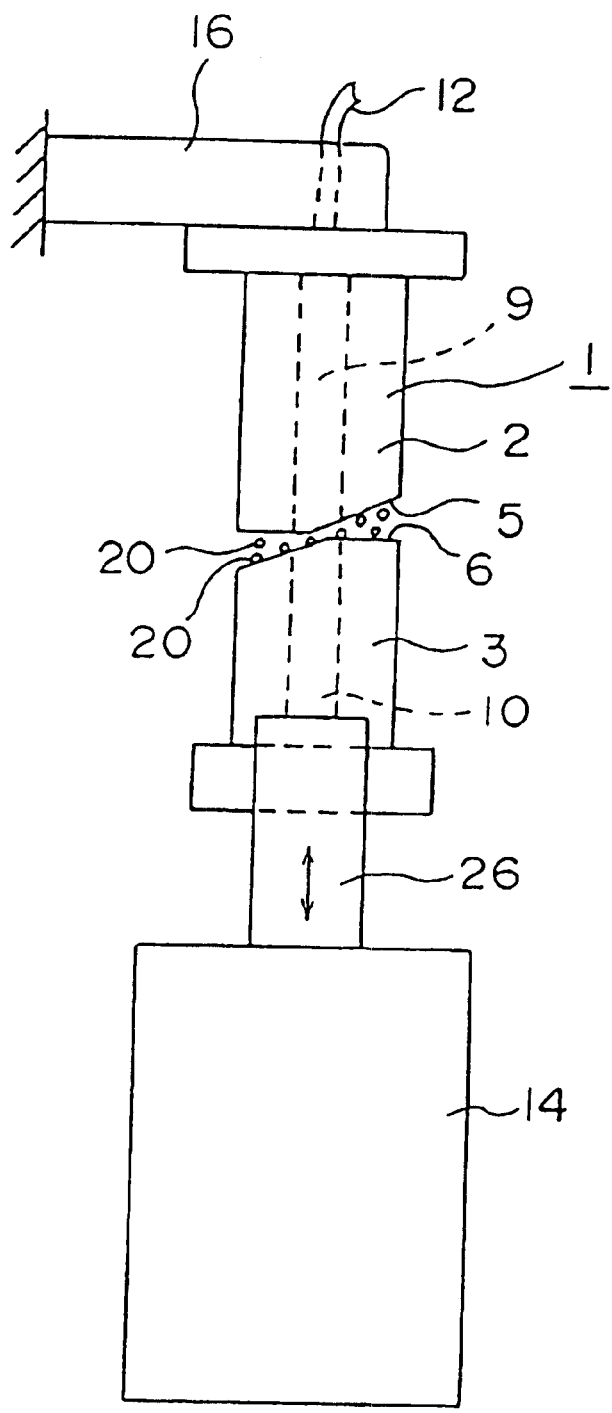
FIG. 2 is a side elevational view of major parts of the apparatus for polishing optical components according to the abovementioned preferred embodiment.

In order to describe the invention in further detail, a description is given of the preferred embodiments with reference to the accompanying drawings. Furthermore, in the description of the preferred embodiments hereinafter, parts which have the same names as those of the conventional example are given the same reference numbers, and the overlapping description thereof is omitted hereinafter. In FIG. 1 and FIG. 2, construction of major parts of one preferred embodiment of a polishing apparatus for which a method for polishing the end faces of optical component according to the invention is applied is illustrated in a state where a multiple-fiber optical connector 1 as an optical component, and a ferrule 3 being a polish-assisting member used for polishing the abovementioned optical connector 1 are attached. Furthermore, in FIG. 1, a front elevational view of the polishing apparatus is illustrated, and in FIG. 2, a side elevational view thereof is illustrated. In FIG. 1, the optical connector 1 and ferrule 3 are shown in their cross-sectional view. Furthermore, in FIG. 4, an entire view of the polishing apparatus is exemplarily illustrated. The components illustrated in FIG. 1 and FIG. 2 are provided at the third polishing process section 30 of an apparatus illustrated in FIG. 4.

Figure 4:
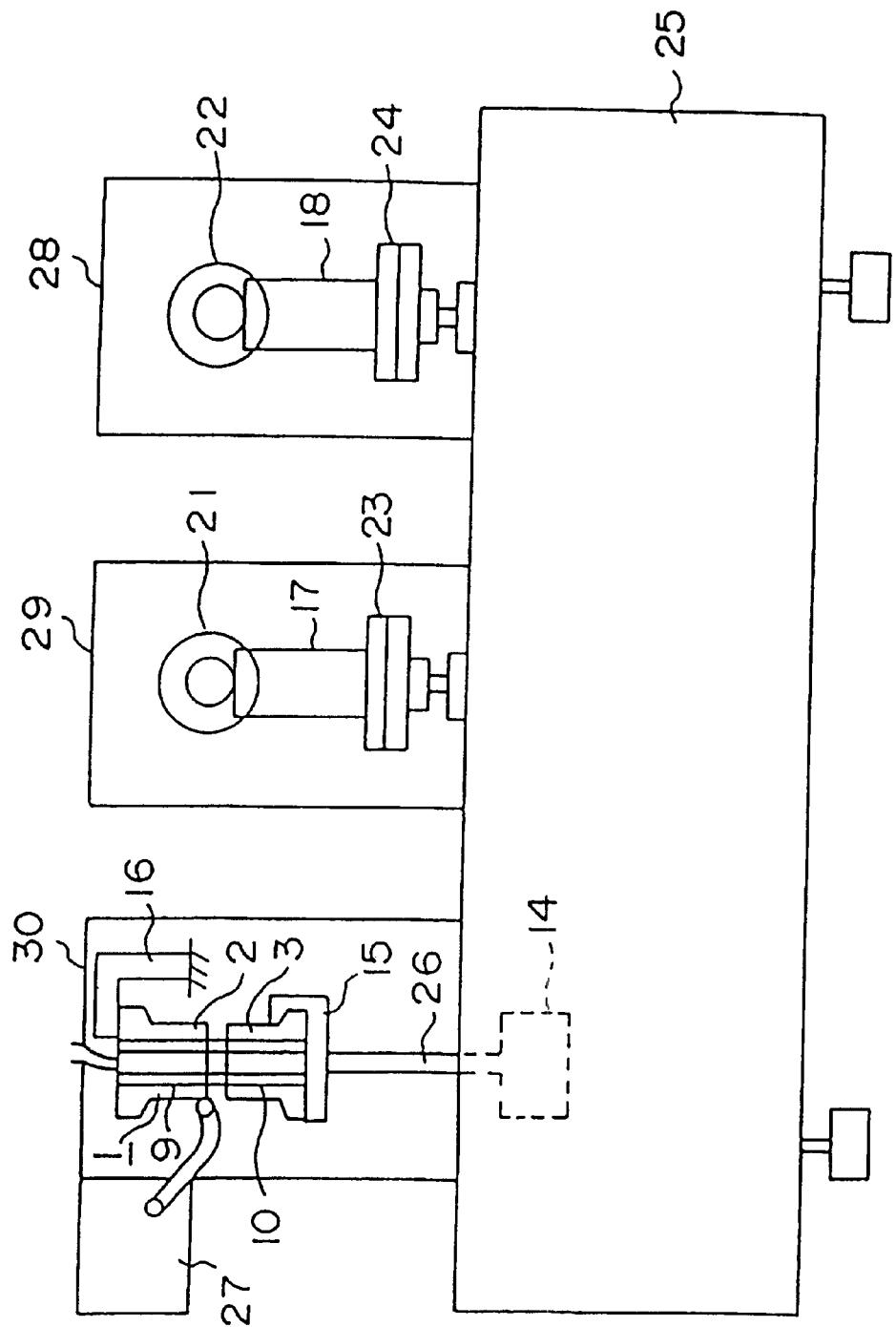
FIG. 4 is an entire construction view of the apparatus for polishing optical components according to the abovementioned embodiment.

As shown in FIG. 4, the polishing apparatus is constructed on a base 25 equipped with a control feature so as to be provided with the first polishing process section 28, the second polishing process section 29, and the third polishing process section 30, wherein the first and second polishing process sections 28 and 29 are, respectively, provided with wheel turning portions 21 and 22, connector holding portions 17 and 18, and moving mechanisms 23 and 24. The third polishing process section 30 is provided with a feeder unit 27 of polishing media in order to polish the end faces of the optical connector 1. The wheel (not illustrated) of the wheel turning portion 21, which is secured at the second polishing process section 29 is constructed of a finer wheel than the wheel (not illustrated) of the wheel turning section 22 of the first polishing process portion 28. Furthermore, the respective moving mechanism 23 and 24 causes the respective connector holding sections 17 and 18 to move left and right or forward and backward (the direction perpendicular to the drawing paper) with respect to the respective wheel turning sections 21 and 22.

In this preferred embodiment, since the first polishing process section 28 and the second polishing process section 29 are thus constructed, the connection end faces 5 (of the ferrule) of the optical connector 1 are coarsely polished in the first polishing process section 28, and thereafter are finely polished to a predetermined profile, for example, so that the angle of the inclined plane of the connection end faces 5 (of the ferrule) becomes 8 degrees. Subsequently, thereafter, the optical connector 1 is moved to the third polishing process section 30, wherein the third polishing process section 30 is a finishing process in which the optical fibers 4 are caused to protrude from the connection end faces 5 (of the ferrule) of the optical connector 1.

As shown in FIG. 1 and FIG. 2, the apparatus for polishing the end faces of optical components according to the abovementioned preferred embodiment is constructed so as to be provided with a connector holding section 16 as a holding section of optical components, and a ferrule disposing section 15 for disposing the ferrule 3 via polishing media 20 intervened with respect to the connection end faces 5 (of the ferrule) of the optical connector 1 held by the connector holding section 16. Furthermore, the ferrule disposing section 15 is provided with, for example, a spring (not illustrated), etc., wherein when the ferrule 3 is located at the ferrule disposing section 15, the ferrule 3 is pressed to the optical connector 1 side by the spring, etc.

Figure 3:
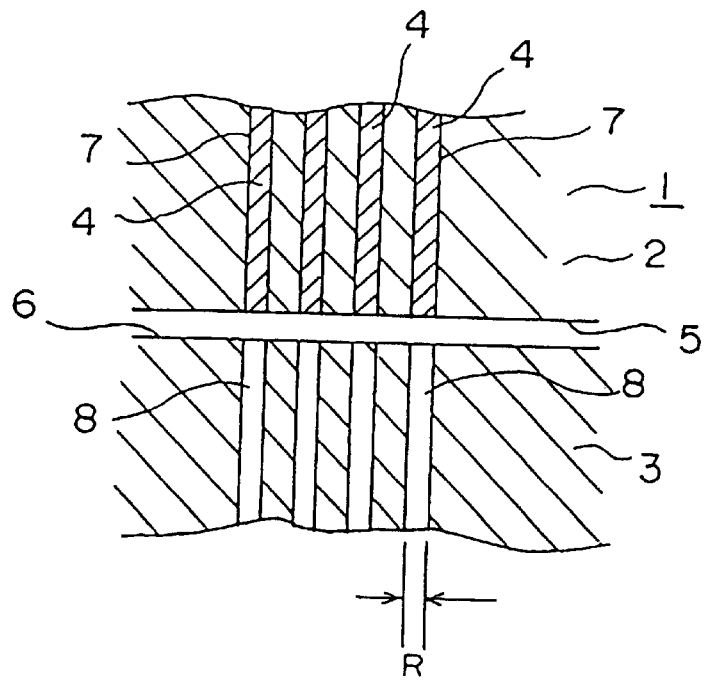
FIG. 3 is an enlarged view explaining and showing an optical fiber disposed area of an optical connector 1 and an optical fiber insertion hole disposed area of a ferrule 3, which are provided in the polishing apparatus according to the abovementioned embodiment.

As in the conventional example, the optical connector 1 used in the abovementioned preferred embodiment is provided with optical fibers 4 made of quartz glass and a ferrule 2 being a molded component made of glass and epoxy resin. Furthermore, the ferrule 3 has optical fiber insertion holes 8, as recesses, formed at the position corresponding to the optical fibers 4 exposed to the connection end faces 5 (of the ferrule) of the optical connector 1, and the ferrule 3 is made of the same material as that of the ferrule 2 of the optical connector 1 and molded so as to have the same profile as that of the ferrule 2 of the optical connector 1. Furthermore, in order to simplify the drawing, in FIG. 1, the respective optical fiber insertion holes 7 and 8 of the ferrules 2 and 3 and the optical fibers 4 of the optical connector 1 are, respectively, illustrated two by two. In fact, there are many cases where more holes and fibers than the above are used. For example, in the examples illustrated in FIG. 3, FIG. 5, and FIG. 6, the abovementioned optical fiber insertion holes 7 and 8 and optical fibers 4 are, respectively, provided four by four.

Figure 5:
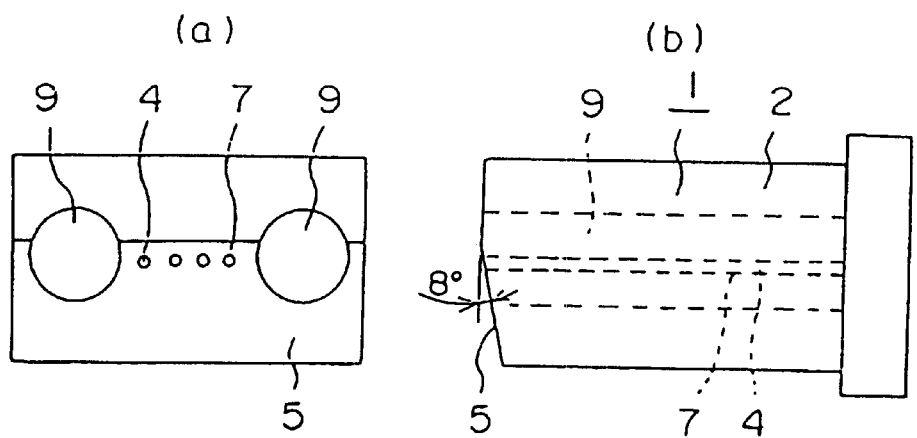
FIG. 5 is a view showing one example of an optical connector 1 disposed in the polishing apparatus of optical components according to the abovementioned embodiment, wherein 5(*a*) is a front elevational view observed from the connection end faces side, and 5(*b*) is a side elevational view of the optical connector 1.
Figure 6:
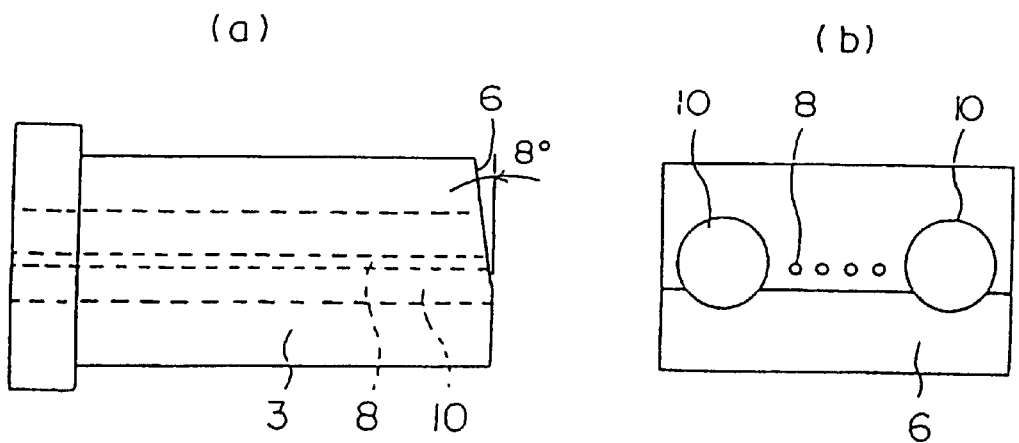
FIG. 6 is a view showing a ferrule 3 disposed in the polishing apparatus of optical components according to the abovementioned embodiment, wherein 6(*a*) is a side elevational view of the ferrule 3, and 6(*b*) is a front elevational view of the ferrule 3 observed from the end face side thereof.

Furthermore, the cross section of the respective optical fiber insertion holes 7 and 8 is circular, the inner diameter R (hole diameter) of which is approximately 126 μm and is formed to be slightly greater than the outer diameter (125 μm) of the optical fibers 4. Furthermore, the connection end faces 5 of the ferrule 2 and the end faces 6 of the ferrule 3 are, as shown in FIG. 5 and FIG. 6, formed of a plane orthogonal to the optical axis of the optical fibers 4 and a plane inclined 8 degrees with respect to the plane orthogonal to the optical axis.

A pin fitting hole 9 is formed at both sides of the optical fiber 4 fixing area in the optical connector 1, and a pin fitting hole 10 is formed at the position corresponding to the pin fitting hole 9 of the optical connector 1 at both sides of the optical fiber insertion hole 8 of the ferrule 3. In this preferred embodiment, a stepped guide pin 11 acting as a fitting pin is inserted into the pin fitting hole 10 of the ferrule 3 and the pin fitting hole 9 of the optical connector 1. Furthermore, the smaller-diametered pin 13 side of the stepped guide pin 11 is inserted into the pin fitting hole 9 of the optical connector 1.

Figure 14:
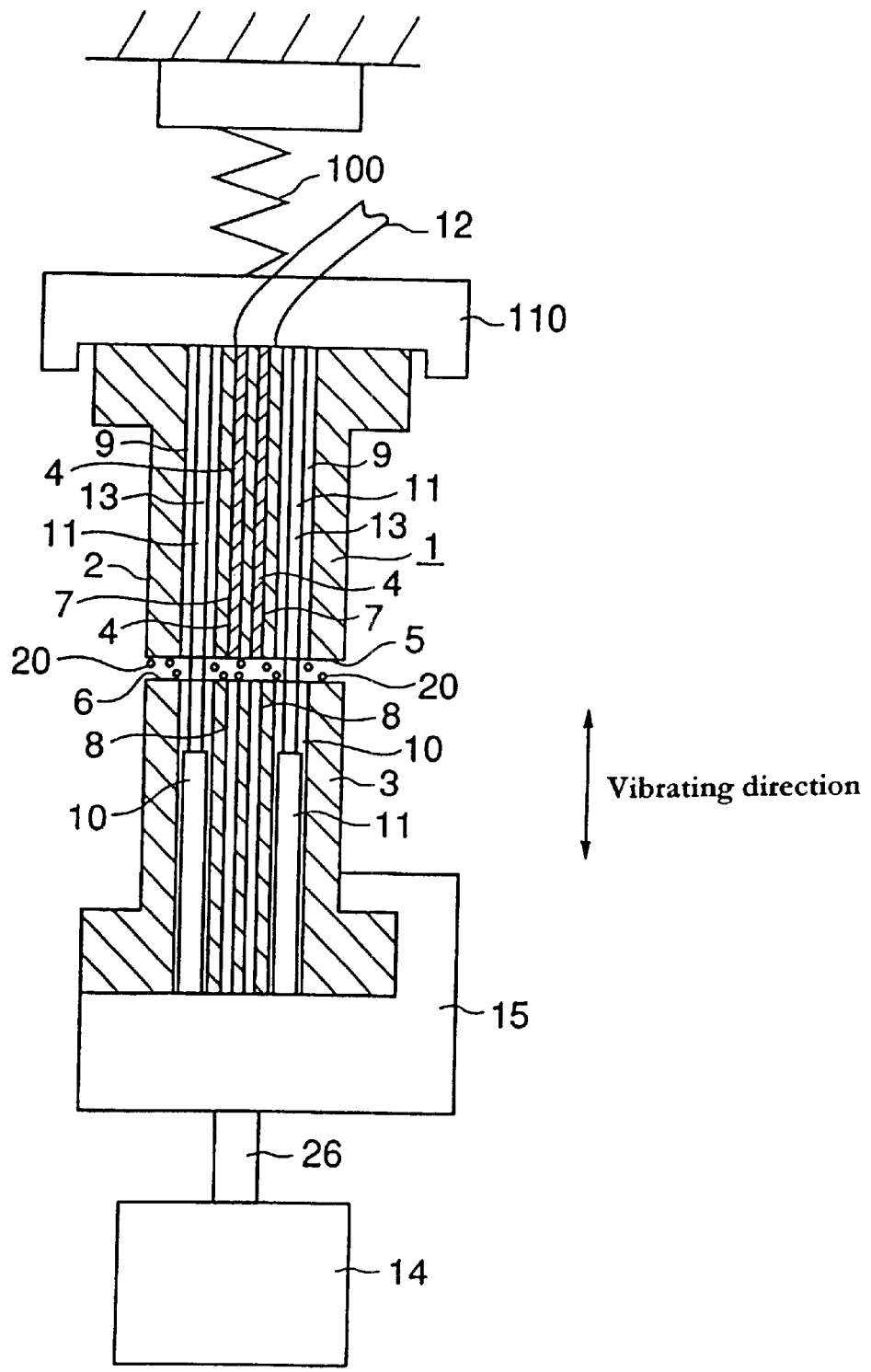
FIG. 14 is an explanatory view of a preferred embodiment showing another construction of the disposed section of the optical connector 1 and ferrule 3.

An ultrasonic wave generator (ultrasonic vibration generator) 14 is secured at the abovementioned ferrule disposing section 15 via a shaft 26, and the ultrasonic wave generator 14 is, as shown in FIG. 14, secured in the base 25. The ultrasonic wave generator 14 causes the ferrule 3 to move in the direction of narrowing and widening the interval between the end faces of the corresponding ferrule 3 and the ferrule 2 in a state where, as described above, the ferrule 3 is pressed to the optical connector 1 side. In the example illustrated in FIG. 1, the ultrasonic wave generator 14 functions as a polishing and moving mechanism by which the connection end faces (of the ferrule) of the optical fibers 4 are polished so as to protrude from the connection end faces 5 of the ferrule 2 by relatively moving the ferrule 3 in the optical axis direction to the optical fibers 4.

The abovementioned embodiment is constructed as described above. Next, a description is given of the polishing method at the connection end faces 5 (of the ferrule) side of an optical connector, in which the polishing apparatus is used. First, an optical connector 1 is held at the connector holding section 18 of the first polishing process section 28 illustrated in FIG. 4, the connection end faces 5 (of the ferrule) thereof are coarsely polished with the connection end faces 5 (of the ferrule) side turned to the wheel turning section 22 side. Next, the optical connector 1 is moved to the second polishing process section 29 and is held at the connector holding section 17, wherein the connection end faces 5 (of the ferrule) are polished with the connection end face 5 side turned to the wheel turning section 21 side.

Thereby, the end faces of the optical fibers 4 of the optical connector 1 and the connection end faces 5 of the ferrule 2 are finely polished. Thereafter, the optical connector 30 is moved to the third polishing process section 1.

Next, as shown in FIG. 1 and FIG. 2, the optical connector 1 is disposed at the upper side of the ferrule 3, the stepped guide pin 11 is inserted into the pin fitting hole 9 of the optical connector 1, wherein a polishing member 20 (for example, diamond abrasive grains whose grain size is approximately 3 μm) is caused to intervene between the connection end faces 5 (of the ferrule) of the optical connector 1 and the end faces 6 of the ferrule 3, and the optical connector 1 is held by the connector holding section 16. Subsequently, in this state, the ultrasonic wave generator 14 is driven to generate ultrasonic waves of 20 KHz for approximately 20 seconds, wherein the ferrule 3 is vibrated in the optical axis Z direction of the optical fibers 4 for relative movements, and the connection end faces 5 (of the ferrule) of the optical connector 1 is polished.

Figure 7:
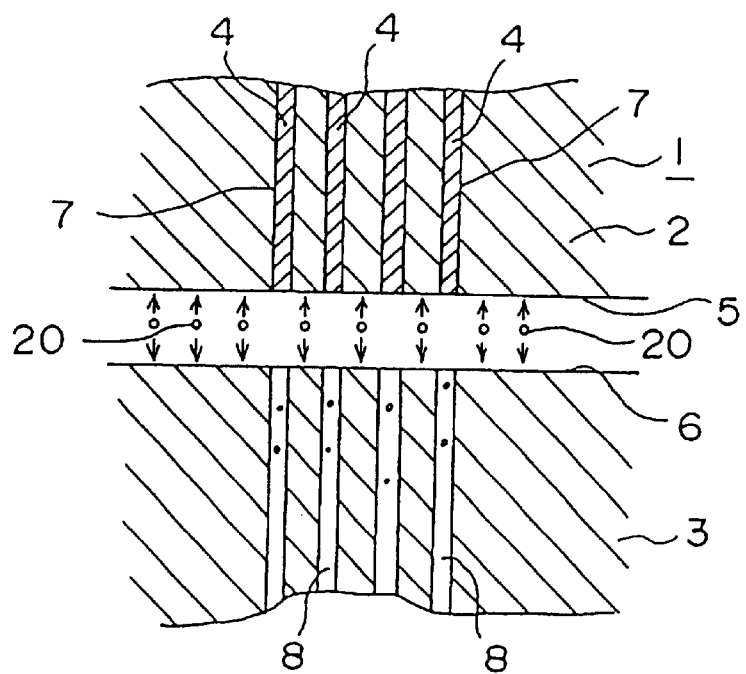
FIG. 7 is a view showing movements of polishing media, which are produced when the polishing apparatus of optical components according to the abovementioned embodiment operates.

Thereby, as shown in FIG. 7, vibration of the ferrule 3 is transmitted to the polishing media 20 to cause the polishing media 20 to move in the optical axis direction of the optical fibers 4, wherein the connection end faces 5 (of the ferrule) of the optical connector 1 are polished. When carrying out this polishing, since the optical fiber insertion holes 8 are formed at the position corresponding to the optical fibers 4 of the optical connector 1 (that is, the position corresponding to the area including the end faces of the optical fibers 4) at the ferrule 3, the polishing media 20 are scarcely brought into contact with the connection end face side of the optical fibers 4 as shown in the same drawing, and drop in the optical fiber insertion holes 8 of the ferrule 3. Therefore, the connection end faces (of the ferrule) of the optical fibers 4 of the optical connector 1 are scarcely polished, and only the connection end faces 5 of the ferrule 2 around the recesses (optical fiber insertion holes 8) are polished.

According to the abovementioned preferred embodiment, as described above, the connection end faces of the optical fibers 4 are scarcely polished at the end face polishing of the optical connector 1, but only the connection end faces 5 of the ferrule there around can be polished. Therefore, it is possible to polish the connection end face side of the optical fibers 4 in a very short time so that the connection end face side of the optical fibers 4 protrudes from the connection end faces (connection end faces of the optical components) 5, wherein by adjusting the drive time, etc., of, for example, the ultrasonic wave generator 14, it is possible to easily obtain a desired amount of protrusion of optical fibers without failure.

Figure 8:
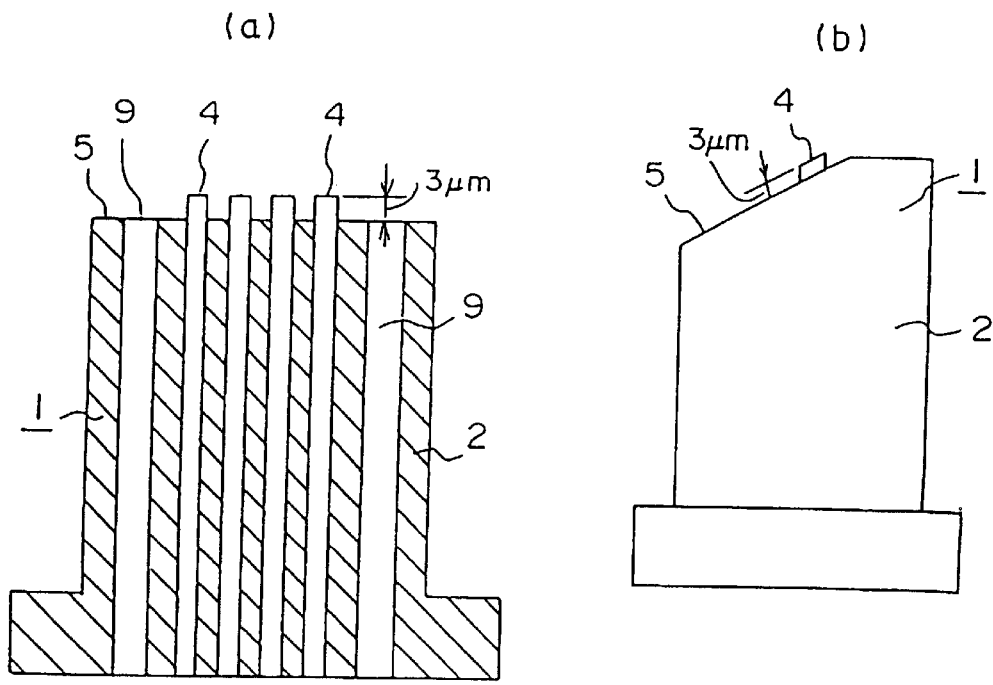
FIG. 8 is a view explaining and showing an optical connector whose connection end face side is polished by using the polishing apparatus of optical components according to the abovementioned embodiment, wherein 8(*a*) is a front elevational view thereof, and 8(*b*) is a side elevational view thereof, FIGS. 9(*a*)–9(*b*) are explanatory views showing another example of the ferrule used for a method for polishing an optical component according to the invention, FIGS. 10(*a*)–10(*b*) are explanatory views showing another recess forming example of the ferrule used in the method for polishing the end faces of an optical component according to the invention.
Figure 17:
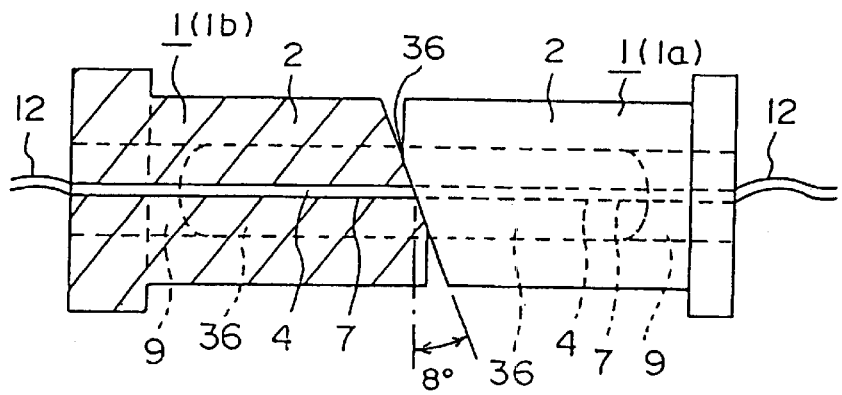
FIG. 17 is an explanatory view showing a connection construction example of a multiple-fiber optical connector.
Figure 18:
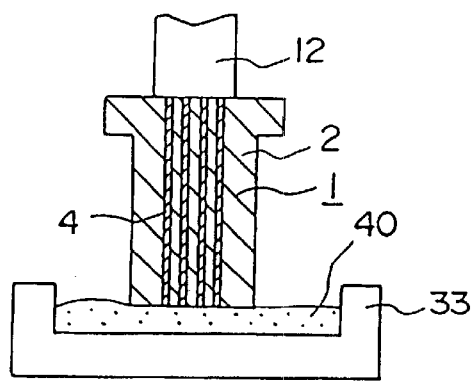
FIG. 18 is an explanatory view showing one example of a conventional method for polishing the end faces of an optical connector.

Actually, the end faces of an optical connector are polished on the basis of the abovementioned method by using a polishing apparatus according to the abovementioned preferred embodiment. As shown in FIG. 8, it was found that the polishing of the connection end faces (of the ferrule) of the optical fibers 4 can be easily carried out in a very short time so that it protrudes 3 μm or so from the connection end faces 5 of the surrounding ferrule 2. And, thus, using the optical connector 1 in which the connection end faces (of the ferrule) of the optical fibers 4 protrude 3 μm or so from the connection end faces 5 of the ferrule 2, an optical connection of the optical connectors 1 is carried out as shown in FIG. 17. As a result, a remarkably good quality PC contact of the optical fibers 4 can be made.

Furthermore, according to the abovementioned preferred embodiment, a ferrule 3 which has the same shape as that of the ferrule 2 of the optical connector 1 is used as a polish-assisting member of the optical connector 1, and the optical connector 1, and the ferrule 3 are positioned with respect to each other by inserting stepped guide pins 11 into the pin fitting hole 9 of the ferrule 2 of the optical connector 1 and the pin fitting hole 10 of the ferrule 3. Therefore, it is possible to very easily and accurately position both of them, wherein the end faces polishing of the abovementioned optical connector 1 can be very easily and accurately carried out.

Furthermore, according to the abovementioned embodiment, the stepped guide pins 11 used for positioning the optical connector 1 and ferrule 3 are made into tapered pins, the upper part of which makes small-diametered pin 13 in the drawing. Since, by inserting the small-diametered pin 13 into the pin fitting hole 9 of the optical connector 1 and performing polishing, comparatively large clearance is produced between the small-diametered pin 13 and the fitting hole 9, it is possible to prevent the pin fitting holes 9 from being polished by the polishing media 20. Therefore, it is possible to securely prevent such a hindrance as the diameter of pin fitting holes 9 are made too large.

Furthermore, the size of an area including (a minute area including the optical wave guide) the optical wave guide end faces in the preferred embodiment can be freely determined by the size of the recess 8 of the polish-assisting member opposite to the area and the positioning accuracy between the optical connector 1 and the polish-assisting member.

For example, polishing was carried out at an optical connector 1, in which the diameter of optical fibers 4 being an optical wave guide is 125 μm, in a state where the diameter of the recess (optical fiber insertion hole) 8 of the ferrule 3 as a polish-assisting member is 126 μm and the diameter of the stepped guide pins 11 at the larger side is 0.698 mm while that at the smaller side is 0.660 mm. At this time, the minute area including the protruded optical wave guide end faces was in a range of approximately 80 μm in diameter. This means that the ground portion apart from the outer diameter of 10 μm of the center core of the optical fibers of an optical wave guide is polished, but no polishing media are brought into contact with the core and the surrounding thereof.

Furthermore, polishing was carried out in a state where the diameter of the optical fiber insertion holes 8 of the abovementioned ferrule 3 was modified to be approximately 180 μm, the range of "the minute area including the optical wave guide end faces", which is not polished, was a diameter range of approximately 135 μm including the optical fibers having a diameter of 125 μm. Furthermore, straight pins (the diameter of the pin insertion hole is 0.7 mm) which is not stepped were used as guide pins 11, and the diameter of the optical fiber insertion holes 8 of the abovementioned ferrule 3 was set to approximately 136 μm, wherein the same polishing was carried out. At that time, the range of "the minute area including the optical wave guide end faces" which is not polished is a diameter range of 125 μm which is equal to the diameter of the optical fibers 4. Therefore, it could be proven that the range of "the minute area including the optical wave guide end faces" which is not polished can be freely variable by adjusting the conditions.

Furthermore, the invention is not limited to the abovementioned embodiment, wherein variable modifications and variations are available. For example, in the abovementioned preferred embodiment, although the polishing media 20 are diamond abrasive grains whose diameter is 3 μm, the grain size and type of the polishing media are not specially limited. They maybe established adequately. For example, they may be alumina, etc. Furthermore, they may be a lapping liquid including these alumina and diamond grains, etc. For example, when carrying out the end face polishing of the optical connector 1 using diamond grains whose diameter is 9 μm as in the abovementioned embodiment, the area including the connection end faces (of the ferrule) of the optical fibers 4 (that is, the minute area including the connection end faces (of the ferrule) of the optical fibers 4) could be caused to protrude approximately 10 μm from the connection end faces of the ferrule 2 at the surrounding thereof.

Furthermore, the polishing media 20 used for polishing optical components such as an optical connector 1 is not necessarily of one type. They may be combined with several types of polishing media, and polishing may be carried out in multiple steps in compliance with the amount of protrusion of an optical wave guide of the optical fibers 4, wherein the type of polishing medium 20 may be varied in each of the steps of polishing.

Furthermore, in the abovementioned embodiment, although the ferrule 3 had the same profile and was made of the same material as those of the ferrule 2 of the optical connector 1, the ferrule 3 may be, for example, a ferrule made of metal, etc.

Figure 9:
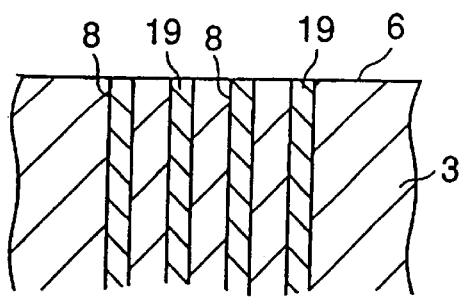
Figure 9:
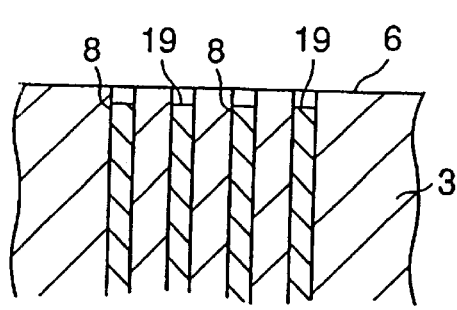

Furthermore, in the abovementioned embodiment, although the optical fiber insertion holes 8 of the ferrule 3 were through holes, the recess such as optical fiber insertion holes 8 was not necessarily a through hole. It may be a recess formed at the position corresponding to the optical wave guide end faces of optical fibers 4 or formed at the position corresponding to the area including the optical wave guide end faces of the optical fibers 4. Furthermore, as shown in FIG. 9(*a*), a softer member 19 than that of the forming material of the ferrule 3 is provided in the recess such as optical fiber insertion holes 8, etc. of the ferrule 3, so that it completely fills up the recesses (optical fiber insertion holes 8) (that is, a soft material 19 may be provided instead of the recess at the forming position of the recesses of a polish-assisting member), or as shown in FIG. 9(*b*), it may be such that slight clearance remains at the surface side of the recesses (optical fiber insertion holes 8) and a soft material 19 is filled up and formed in the clearance of the recesses. If the resiliency of Young's modulus E1 of the soft material 19 is made smaller than the resiliency Young's modulus of the forming material of the ferrule, the polishing energy transmitted to the portion opposite to the recesses is made smaller than the polishing energy given to the ferrule 2 at the surrounding thereof when polishing the end faces of the optical connector 1 by polishing media 20. Therefore, with effects similar to those in the abovementioned preferred embodiment, it is possible to polish the area including the connection end faces (of the ferrule) of optical fibers 4 so that the area protrudes from the connection end faces 5 of the ferrule 2 at the surrounding thereof.

In particular, as shown in FIGS. 9(*a*) and (*b*), in a case where a softer member 19 than that of the forming material of the ferrule 3 is provided in the recesses of the optical fiber insertion holes 8 of the ferrule 3 and the connection end faces (of the ferrule) of the optical connector 1 (ferrule 2) is polished, a slight (weak) polishing force operates on the connection end faces (of the ferrule) of optical fibers 4 opposite to the recesses (soft members 19). Thereby, even though the polishing of the optical wave guide end faces (end faces of fibers) is not sufficient at the stage of termination of the previous polishing process (the polishing process at the second polishing process section 29), fine polishing is continuously carried out in the third polishing process section 30. Therefore, the optical wave guide end faces can be finely polished, and moreover, as described above, since the polishing at parts other than the part corresponding to the recesses 8 can be progressively carried out, it is possible to polish the area including the connection end faces (of the ferrule) of the abovementioned optical fibers 4 so that they effectively protrude from the connection end faces 5 of the ferrule 2 at the surrounding thereof.

Figure 10:
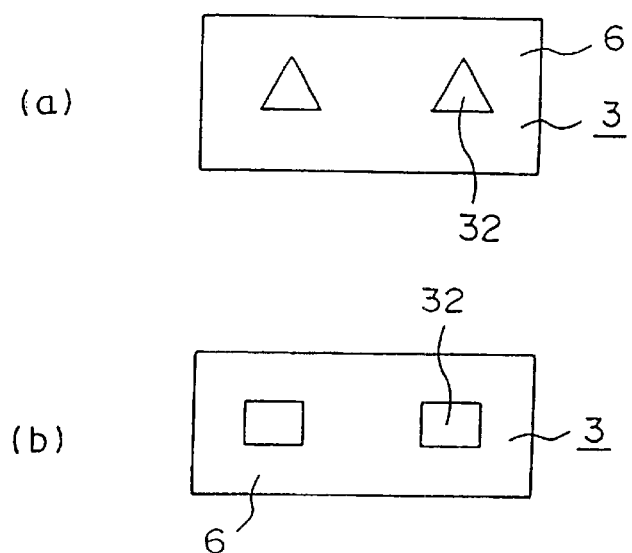

Furthermore, in the abovementioned preferred embodiment, although the cross section of the optical fiber insertion holes 8 of the ferrule 3 is made into circular holes, for example, as shown in FIGS. 10(*a*) and (*b*), recesses 32 having a triangular or square cross section may be provided at the end face 6 side of the ferrule 3 instead of the optical fiber insertion holes 8. Thus, it is not necessary that the shape or profile of the recesses secured at the polish-assisting member such as a ferrule 3 is particularly limited. The shape thereof may be adequately determined in compliance with the shape or profile of the end faces of an optical wave guide such as optical fibers 4.

Furthermore, in the abovementioned embodiment, stepped guide pins 11 are inserted in the pin fitting hole 9 of an optical connector 1 and into pin fitting hole 10 of the ferrule 3 as fitting pins to cause the optical connector 1 and ferrule 3 to be correctly positioned with respect to each other, straight pins having no step may be inserted into the abovementioned pin fitting holes 9 and 10 as fitting pins.

Furthermore, in the abovementioned embodiment, although the positioning of the ferrule 3 and the optical connector 1 is carried out by inserting stepped guide pins 11 into the pin fitting hole 9 of the optical connector 1 and pin fitting hole 10 of the ferrule 3 when polishing the connection end faces 5 (of the ferrule) side of the optical connector 1, the optical connector 1 and ferrule 3 may be positioned with respect to each other on the basis of the outside profile of the optical connector 1 and that of the ferrule 3, wherein the optical fiber insertion holes 8 of the ferrule 3 are positioned with respect to the optical fibers 4 exposed to the connection end faces 5 (of the ferrule) of the optical connector 5, thereby polishing the connection end faces 5 (of the ferrule) of the optical connector 1.

Furthermore, in the abovementioned embodiment, although the ferrule 3 side is vibrated by an ultrasonic wave generator 14, the optical connector 1 side may be vibrated instead of vibrating the ferrule 3 side, or both the optical connector 1 and ferrule 3 are vibrated to make relative movements therebetween, wherein the connection end faces (of the ferrule) of the optical connector 1 is polished. Furthermore, a polishing and moving mechanism (a mechanism of narrowing and widening to vibrate and change the interval between the end faces of the optical connector 1 and the end faces of the ferrule 3), which vibrates one or both of the end faces of the optical connector 1 and the end faces of the ferrule 3, may be a vibrator device 99 instead of the ultrasonic wave generator 14. Furthermore, although the vibrating direction (direction of narrowing and widening to vibrate and change the interval between the end faces of the optical connector 1 and the end faces of the ferrule 3) is determined to be the optical axis direction of an optical wave guide (optical fibers 4), the direction may be diagonal so as to have a certain angle with respect to the optical axis direction, wherein the angle of the movement is not limited so long as the direction is a direction of narrowing or widening to vibrate and change the interval between the end faces of the optical connector 1 and the end faces of the ferrule 3.

Furthermore, in the abovementioned embodiment, ultrasonic waves of 20 KHz are generated by an ultrasonic wave generator 14 for approx. 20 seconds when polishing the end faces of an optical connector 1, the frequency of ultrasonic waves generated by the ultrasonic wave generator 14 and the time of generating the ultrasonic waves are not particularly limited, but are adequately established. By adequately establishing the ultrasonic wave generating frequency and the time of generation, it is possible to obtain a desired amount of protrusion of optical fibers.

Furthermore, in the abovementioned embodiment, although a spring is provided at the ferrule disposing base 15 so that the ferrule 3 is pressed to the optical connector 1 side, a means of pressing the ferrule 3 to the optical connector 1 side is not limited to a spring. It may be adequately determined. Furthermore, it may be employed that the optical connector 1 side is pressed to the ferrule 3 side instead of pressing the ferrule 3 to the optical connector 1 side, and the optical connector 1 and ferrule 3 may be disposed so that both of them are pressed to each other.

Figure 15:
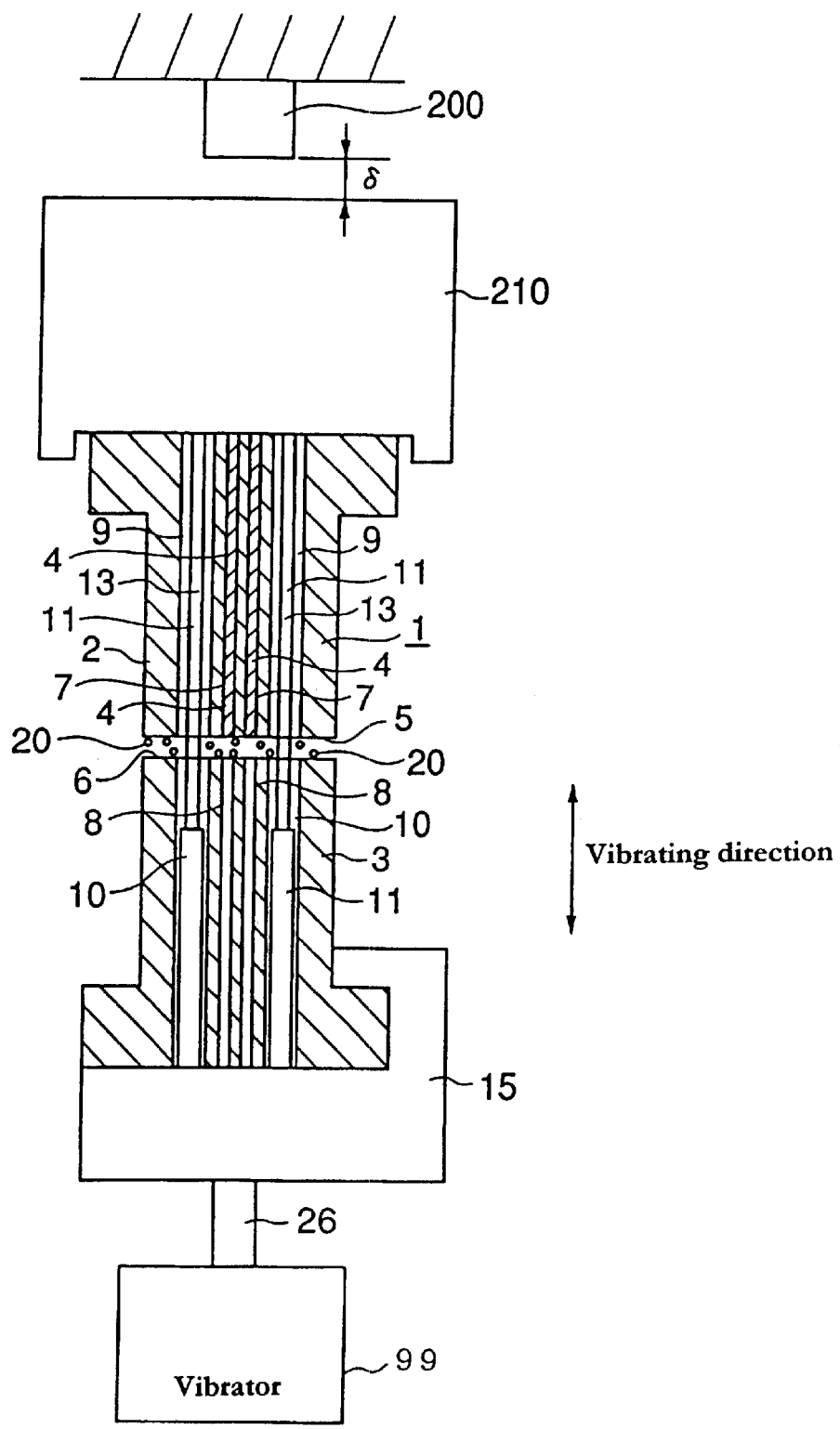
FIG. 15 is an explanatory view of a preferred embodiment showing still another construction of the disposed section of the optical connector 1 and ferrule 3.
Figure 16:
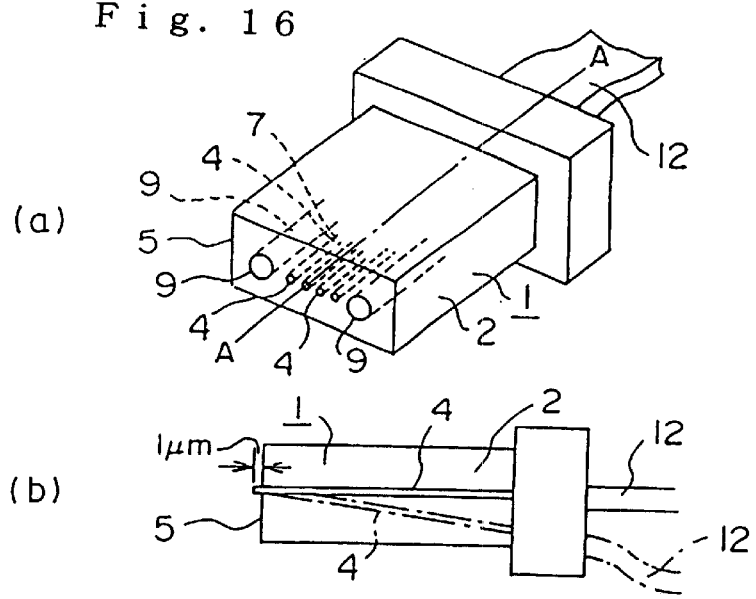
FIG. 16 is a view explaining and showing one example of a multiple-fiber optical connector, wherein 16(*a*) is a perspective view thereof, and 16(*b*) is an explanatory view shown by using a cross-sectional view taken along the line A—A in (*a*)

Furthermore, for example, other configurations illustrated in FIG. 14 and FIG. 15 may be employed as a configuration of the disposing section of the optical connector 1 and ferrule 3. The configuration shown in FIG. 14 is such that the upper side of the optical connector 1 is pressed by a pressing member 110, a pressing force of a compression spring 100 is added to the optical connector 1, and polishing is carried out by ultrasonic vibration.

The configuration shown in FIG. 15 is such that a vibrator device is provided instead of the ultrasonic generator 14, the upper side of the optical connector 1 is held by a holder 210, clearance δ is secured between the holder 210 and stopper 200, and the vibrator device is driven in this state in order to give vibration thereto, wherein the end face polishing of the optical connector 1 is carried out. In the configuration shown in FIG. 15, if vibration is given by the vibrator, the optical connector 1 and holder 210 receive a pressing force as an integral body and are brought into collision with the stopper 200. As a result thereof, they are returned to moved downward by the reaction. Furthermore, they receives a pressing force of the vibrator vibration by way of returning movement thereof and are again brought into collision with the stopper 200. Thus, since the vibration and movement are repeatedly carried out, the end face polishing of the optical connector 1 is effectively performed.

In either configuration in FIG. 14 or FIG. 15, since abrasive grains (polishing media) 20 intervene between the optical connector 1 and ferrule 3, a preferable polishing is achieved.

Furthermore, in the abovementioned embodiment, although the ferrule 3 is vibrated to polish the connection end faces (of the ferrule) of an optical connector 1 by using the ultrasonic wave generator 14, a polishing and moving mechanism of a compression polishing system in which pressure is given to one or both of the optical connector 1 and ferrule 3 may be employed instead of the ultrasonic wave generator 14. In this case, at least one of either the optical connector 1 or ferrule 3 is relatively moved in the optical axis direction of the optical fibers 4, that is, in the direction of vibrating the interval between the end faces of the optical connector 1 and the end faces of the ferrule 3, wherein the connection end faces 5 (of the ferrule) of the optical connector 1 are polished by the polishing member 20.

Furthermore, in the abovementioned embodiment, although a description was given of a method for polishing the connection end faces (of the ferrule) of one optical connector 1, for example, the holding section of optical components such as an optical connector 1, etc., may be constructed so that it can hold a plurality of optical components, and the connection end faces (of the ferrule) of a plurality of optical components may be collectively polished. In this case, the polishing and moving mechanism such an ultrasonic wave generator 14, etc., may be such that, in a state where polishing media 20 intervene between the connection end faces (of the ferrule) of the group of optical components held by the holding section of optical components and the polish-assisting members such as a ferrule 3, at least one of either the polish-assisting members or the group of optical components is relatively moved, for example, in the optical axis direction of the optical wave guide of optical fibers 4, etc., that is, the direction of narrowing or widening to vibrate and change the interval between the end faces of the optical connector 1 and the end faces of the ferrule 3, wherein the area including the connection end faces (of the ferrule) of the optical wave guide of the group of optical components is polished so as to protrude from the connection end faces (of the ferrule) of a housing such as a ferrule 2 at the surrounding thereof. Thus, the end faces of optical components are collectively polished, whereby the end faces polishing of optical components can be more efficiently carried out.

Furthermore, in the abovementioned embodiment, although an optical connector 1 is such that it has quartz glass made optical fibers 4 and a ferrule 2 of a molded body consisting of glass and epoxy resin, the material of an optical connector 1 which is polished by using a method for polishing optical components and an apparatus for doing the same according to the invention is not specially limited. For example, the material may be ceramics such as zirconium, etc.

Furthermore, in the abovementioned embodiment, although a description was given of the method for polishing the connection end faces 5 (of the ferrule) of a multiple-fiber optical connector 1 whose connection end faces 5 (of the ferrule) are inclined, the method for polishing optical components and the apparatus for doing the same according to the invention may be applicable to the end face polishing of a multiple-fiber optical connector 1 whose connection end faces 5 (of the ferrule) are a perpendicular plane with respect to the optical axis of optical fibers 4 as shown by a chain line in FIG. 14(b), the end face polishing of an optical connector 1 in which the optical fibers 4 are diagonally provided in the ferrule 2 or the pin fitting hole 9 is diagonally provided in the ferrule 2, and the end face polishing 5 of an optical connector 1 such as a single-fiber optical connector 1 whose connection end faces 5 (of the ferrule) are curved.

Furthermore, in the abovementioned embodiment, although the end face polishing of an optical connector 1 is carried out by using a ferrule 3, whose shape or profile is the same as the optical connector 1 and whose material is also the same as that of the optical connector 1, as a polish-assisting member, the polish-assisting member is not necessarily limited to the ferrule 3. That is, such a polish-assisting member may be used to polish optical component end faces, in which a recess is formed at the position corresponding to the optical wave guide end faces of an optical component or at the rear including the optical wave guide end faces of an optical component, or as shown in FIG. 9(b), a soft material 19 is filled up in the recess, or as shown in FIG. 9(a), a softer member than that of the material at the surrounding of the position corresponding to the area including the optical wave guide end faces exposed to the connection end faces (of the ferrule) of an optical component is provided at the abovementioned position.

Furthermore, the method for polishing the end faces of optical components and the apparatus for doing the same according to the invention may be applicable as a method for polishing various kinds of optical components and the apparatus for doing the same, in which optical wave guides such as optical fibers 4 and optical wave guides. That is, the present invention is widely applicable as a method for polishing the end faces of optical component and apparatus for doing the same, which polish the connection end faces (of the ferrule) of optical components other than an optical connector and finish by the optical wave guides (area including the optical wave guide end faces) protruded from the connection end faces (of the ferrule) of optical components.

Furthermore, the method for polishing the end faces of optical components and the apparatus for doing the same according to the invention are not limited to optical components constructed of quartz-based optical fibers and plastic-based ferrule, which are illustrated in the abovementioned embodiment. For example, they are also applicable as a method and apparatus for polishing optical components according to another embodiment illustrated in FIG. 11.

Figure 11:
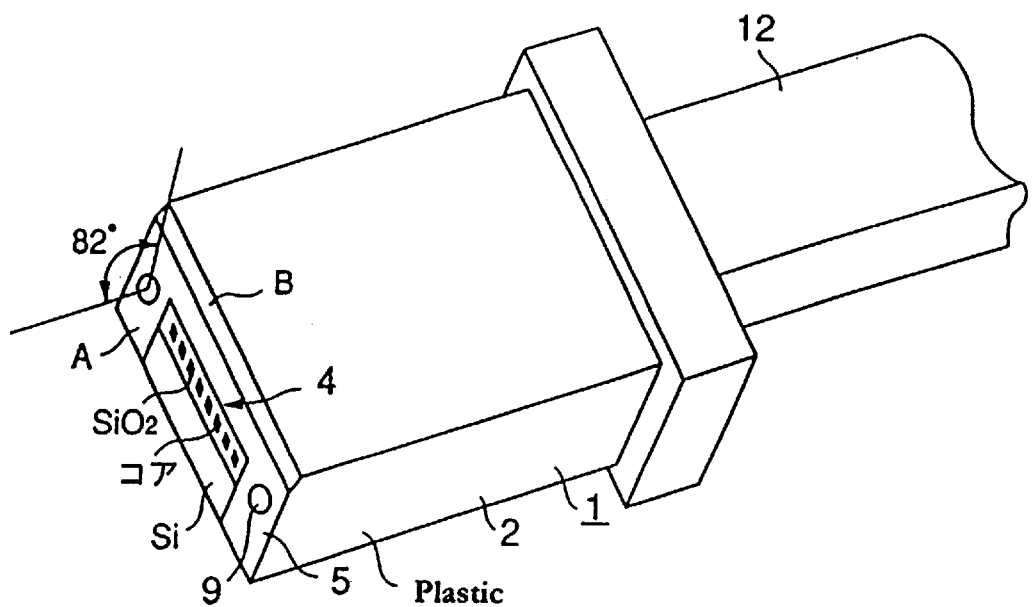
FIG. 11 is an explanatory view showing another construction pattern of an optical connector used in the method for polishing the end faces of an optical component according to the invention.

The optical component illustrated in FIG. 11 is such that Si and quartz-based substrate on which multiple cores (material: quartz, 8 cores in the drawing) acting as optical wave guides are accommodated in a ferrule 2 being a housing, and the multiple cores are exposed to the connection end faces 5 (of the ferrule) of the optical connector 1, wherein the connection end faces 5 (of the ferrule) have a plane A inclined 82 degrees with respect to the optical axis of the optical wave guide and a plane B orthogonal to the optical axis of the optical wave guide.

As regards the optical component illustrated in FIG. 11, polishing which is similar to the abovementioned embodiment is carried out by using an 8-fiber ferrule which acts as a polish-assisting member having a recess portion 8, similar to that of the abovementioned embodiment, formed thereon. The area including the optical wave guide end faces having a diameter of approx. 80 μm could be caused to protrude 2 μm in the respective optical wave guides each having a core of 10 μm square in a short time. As a matter of course, it is possible to obtain a desired amount of protrusion by controlling conditions such as polishing time, etc., without limiting the amount of protrusion.

Figure 12:
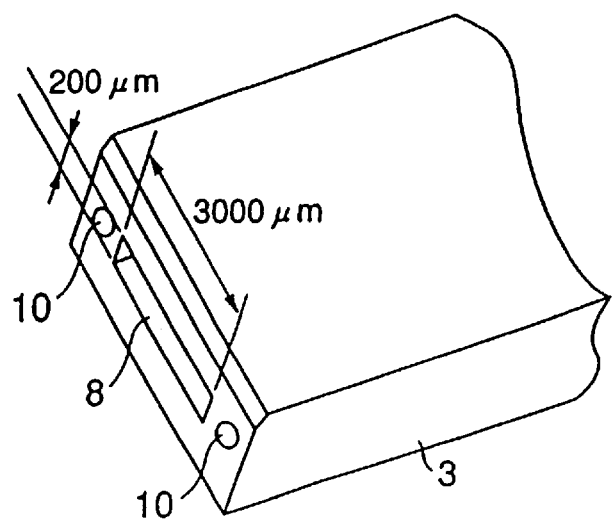
FIG. 12 is an explanatory view showing still another construction pattern of an optical connector used in the method for polishing the end faces of an optical component according to the invention.
Figure 13:
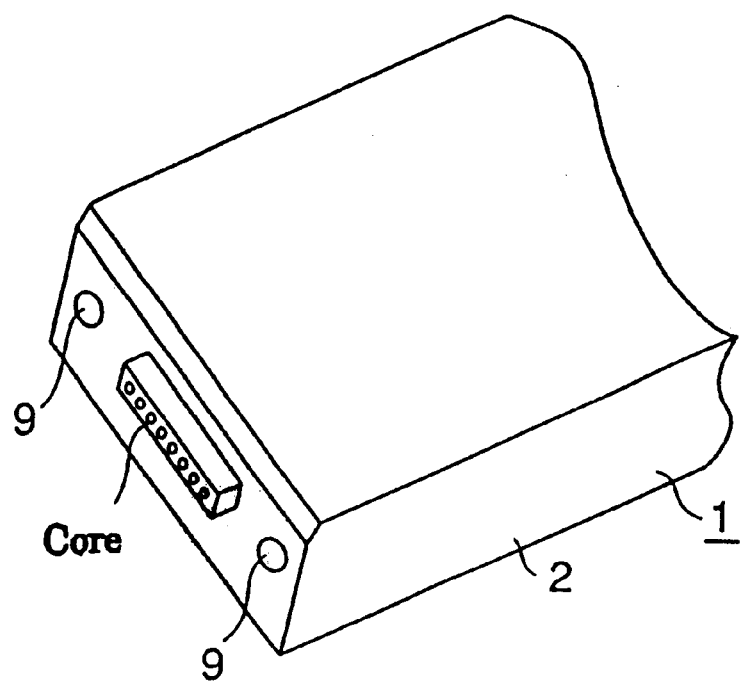
FIG. 13 is an explanatory view of the polished connection end faces (of the ferrule) of an optical connector, which are obtained after polishing the optical connector illustrated in FIG. 11 by using the ferrule illustrated in FIG. 12.

In this case, a ferrule having a rectangular recess 8 as shown in FIG. 12 is used as a polish-assisting member instead of the abovementioned 8-fiber ferrule, whereby the end faces of rectangular minute areas, collectively, including the 8 cores shown in FIG. 13 can be caused to protrude a desired amount of protrusion.

Next, a description is given of the detailed example of polishing an optical component using the polishing method according to the abovementioned embodiment.

[Detailed Example 1]

Object to be polished:

A connection end face was polished, wherein a 12-fiber MPO optical connector was used as a workpiece.

Polishing conditions:

Ultrasonic wave system, Frequency of 20 KHz, Pressing of 0.1 Kgf, Diamond grains whose grain size is 3 μm were used as polishing media 20, and the polishing time was approx. 20 seconds.

Results of the polishing:

The amount of protrusion of the area including the end face of the optical fibers was 4 μm, the length unevenness of protrusion among the end faces of the optical fibers was a little less than 0.5 μm.

The connection capacity of the polished optical connector was checked, wherein the fluctuation of the connection loss between a case where a connection assisting agent is provided and a case where no connection assisting agent is provided was 0.02 dB or less. Therefore, a remarkably good quality PC contact could be achieved.

[Detailed Example 2]

Object to be polished:

A connection end face was polished, wherein a 12-fiber MPO optical connector was used as a workpiece.

Polishing conditions:

Vibration system: by a vibrator, vibrator frequency: 100 Hz, vibrator amplitude: Approx. 90 μm, weight of connector holder 210: 300 gf, Connector holder amplitude: Approx. 200 μm, Vibration frequency of the connector holder 210: Approx. 100 Hz, Interval between the end faces of the optical connector 1 and ferrule 3 at the beginning when the vibrator stops: approx. 150 μm, Diamond grains whose diameter was 6 μm were used as polishing media 20, and polishing time: approx. 120 seconds.

Results of the polishing:

The amount of protrusion of the optical fiber end face was 2 μm, and the length unevenness of protrusion among the end faces of the optical fibers was a little less than 0.5 μm.

The connection capacity of the polished optical connector was checked, wherein the fluctuation of the connection loss between a case where a connection assisting agent is provided and a case where no connection assisting agent is provided was 0.02 dB or less. Therefore, a remarkably good quality PC contact could be achieved.

INDUSTRIAL APPLICABILITY

As described above, an optical component according to the invention is applicable to an optical component such as an optical connector, etc., which is used to enable a PC contact of such a type as the optical wave guide end faces are caused to protrude a desired amount of protrusion from the connection end faces (of the ferrule), and further the method for polishing the end faces of an optical component and the apparatus for doing the same are suitable as a method and apparatus for causing the end faces of an optical wave guide to protrude a desired amount of protrusion from the connection end faces (of the ferrule) of various types of optical components including an optical connector.

What is claimed is:

1. A method for polishing a connection end face of an optical component having at least an optical waveguide disposed within a ferrule, the method comprising the steps of:

disposing the optical component and a polishing-assisting member movable relative to each other along the optical axis of the at least an optical waveguide, wherein the polishing-assisting member has at least a recess formed in an end face opposite to the connection end face of the optical component, and wherein the at least a recess is located opposite the at least an optical waveguide and has a cross section encompassing the cross section of the at least an optical waveguide;

disposing a polishing media in an interval between the end face of the optical component and the end face of the polishing-assisting member; and, polishing the connection end face of the optical component by successively narrowing and widening the interval such that the polishing media is caused to move in the direction along the optical axis of the at least an optical waveguide between the connection end face of the optical component and the end face of the polishing-assisting member at locations other than the at least a recess causing at least a portion of the connection end face of the optical component to protrude from the connection end face, wherein the at least a portion includes the at least an optical waveguide.

2. A method for polishing a connection end face of an optical component as defined in claim 1, comprising the step of disposing a material softer than a material forming the polishing-assisting member into the at least a recess of the polishing-assisting member.

3. A method for polishing a connection end face of an optical component as defined in claim 1, wherein the polishing-assisting member comprises a ferrule and, wherein the at least a recess comprises an optical fiber insertion hole.

4. A method for polishing a connection end face of an optical component as defined in claim 3, wherein the ferrule of the optical component and the ferrule of the polishing-assisting member comprise at least a pin fitting hole and, wherein at least a fitting pin is fitted into the at least a pin fitting hole of the ferrule of the optical component and into the respective at least a pin fitting hole of the ferrule of the polishing-assisting member during the step of polishing the connection end face of the optical component.

5. A method for polishing a connection end face of an optical component as defined in claim 3, wherein the interval is successively narrowed and widened using a vibrator providing ultrasonic vibrations.

6. A method for polishing a connection end face of an optical component as defined in claim 1, wherein the at least a recess is located opposite a plurality of waveguides and, wherein the cross section of the at least a recess encompasses the cross sections of the plurality of optical waveguides.

7. A method for polishing a connection end face of an optical component as defined in claim 1, wherein the interval is successively narrowed and widened using a vibrator providing ultrasonic vibrations.

8. A method for polishing a connection end face of an optical component as defined in claim 1, wherein a length unevenness of protrusion among end faces of the at least an optical waveguide is 0.5 $\mu$m or less.

9. A method for polishing a connection end face of an optical component as defined in claim 8, wherein the protrusion of the at least a portion is 5 $\mu$m or less.

10. A method for polishing a connection end face of an optical component as defined in claim 1, wherein the protrusion of the at least a portion is 5 $\mu$m or less.

11. A method for polishing a connection end face of an optical component having at least an optical waveguide disposed within a ferrule, the method comprising the steps of:

disposing the optical component and a polishing-assisting member movable relative to each other along the optical axis of the at least an optical waveguide, wherein the polishing-assisting member has at least a portion of an end face opposite to the connection end face of the optical component made of a material having a Young's modulus smaller than the Young's modulus of a material of the ferrule, and wherein the at least a portion is located opposite the at least an optical waveguide and has a cross section encompassing the cross section of the at least an optical waveguide;

disposing a polishing media in an interval between the end face of the optical component and the end face of the polishing-assisting member; and, polishing the connection end face of the optical component by successively narrowing and widening the interval such that the polishing media is caused to move in the direction along the optical axis of the at least an optical waveguide between the connection end face of the optical component and the end face of the polishing-assisting member, wherein the polishing energy transmitted to the connection end face is less at locations opposite the portions of the end face of the polishing-assisting member made of a material having a Young's modulus smaller than the Young's modulus of a material of the ferrule causing at least a part of the connection end face of the optical component to protrude from the connection end face, wherein the at least a part includes the at least an optical waveguide.

12. An apparatus for polishing a connection end face of an optical component having at least an optical waveguide disposed within a ferrule, the apparatus comprising:

a first holding section for holding the optical component;

a second holding section for disposing a polishing-assisting member at an interval opposite the connection end face of the optical component, the polishing-assisting member having at least a recess formed in an end face opposite to the connection end face of the optical component, wherein the at least a recess is located opposite the at least an optical waveguide and has a cross section encompassing the cross section of the at least an optical waveguide;

a mechanism for successively narrowing and widening the interval by moving the first holding section and the second holding section relative to each other along the optical axis of the at least an optical waveguide in order to polish the connection end face of the optical component by causing polishing media disposed in the interval to move in the direction along the optical axis of the at least an optical waveguide between the connection end face of the optical component and the end face of the polishing-assisting member at locations other than the at least a recess causing at least a portion of the connection end face of the optical component to protrude from the connection end face, wherein the at least a portion includes the at least an optical waveguide.

13. An apparatus for polishing a connection end face of an optical component as defined in claim 12, wherein the first holding section holds a plurality of optical components and, wherein the second holding section holds a plurality of respective polishing-assisting members.

14. An apparatus for polishing a connection end face of an optical component as defined in claim 12, wherein the mechanism for successively narrowing and widening the interval comprises an ultrasonic wave vibration device.

* * * * *